US009756557B2

(12) United States Patent
Khude et al.

(10) Patent No.: US 9,756,557 B2
(45) Date of Patent: Sep. 5, 2017

(54) METHOD OF USING UE DISCOVERY FOR PAGING OPTIMIZATION

(71) Applicant: QUALCOMM Incorporated, San Diego, CA (US)

(72) Inventors: Nilesh Nilkanth Khude, Somerset, NJ (US); Saurabha Rangrao Tavildar, Jersey City, NJ (US); Michaela Vanderveen, Tracy, CA (US); Junyi Li, Chester, NJ (US); Vincent Douglas Park, Budd Lake, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 305 days.

(21) Appl. No.: 13/797,689

(22) Filed: Mar. 12, 2013

(65) Prior Publication Data

US 2014/0024378 A1 Jan. 23, 2014

Related U.S. Application Data

(63) Continuation-in-part of application No. 13/554,866, filed on Jul. 20, 2012, now Pat. No. 9,049,645.

(51) Int. Cl.
*H04W 48/16* (2009.01)
*H04W 68/02* (2009.01)
(Continued)

(52) U.S. Cl.
CPC .............. *H04W 48/16* (2013.01); *H04W 8/06* (2013.01); *H04W 68/00* (2013.01); *H04W 68/02* (2013.01);
(Continued)

(58) Field of Classification Search
CPC ...... H04W 88/08; H04W 68/02; H04W 48/16
See application file for complete search history.

(56) References Cited

U.S. PATENT DOCUMENTS 7,574,223 B2 * 8/2009 Funato et al. ................ 455/458
7,949,358 B2 * 5/2011 Wentink et al. .............. 455/515
(Continued)

FOREIGN PATENT DOCUMENTS

| EP | 1333627 A1 | 8/2003 |
| WO | 09136844 | 11/2009 |
| WO | 2012050491 A1 | 4/2012 |

OTHER PUBLICATIONS

International Search Report and Written Opinion—PCT/US2014/024338—ISA/EPO—Jul. 9, 2014.

*Primary Examiner* — Lakeram Jangbahadur
(74) *Attorney, Agent, or Firm* — James K. O'Hare

(57) ABSTRACT

Methods and apparatus are described for refining, e.g., reducing, a paging area corresponding to a user equipment device, e.g., a cellular inactive UE device. Various embodiments are well suited for communications systems in which user equipment devices participate in peer to peer communications networks in which direct user device to user device communications are employed. A user equipment device participating in a peer to peer network transmits discovery signals. A femto base station and/or a cellular active UE device in the local vicinity of the UE device transmitting the peer to peer discovery signal eavesdrops on the peer discovery signaling and detects the presence of the cellular inactive UE device. The detection of the cellular inactive UE device is reported to a MME. The MME determines a paging area corresponding to the detected UE device based on the reported information and the location of the reporting device.

17 Claims, 9 Drawing Sheets

(51) Int. Cl.
   *H04W 68/00*   (2009.01)
   *H04W 8/06*    (2009.01)
   *H04W 76/02*   (2009.01)
   *H04W 60/00*   (2009.01)
   *H04W 84/04*   (2009.01)

(52) U.S. Cl.
   CPC .......... *H04W 60/00* (2013.01); *H04W 76/023* (2013.01); *H04W 84/045* (2013.01)

(56) References Cited

U.S. PATENT DOCUMENTS

| | | | |
|---|---|---|---|
| 7,969,954 B2* | 6/2011 | Abhishek et al. | 370/338 |
| 2005/0136930 A1* | 6/2005 | Dent | 455/445 |
| 2006/0171332 A1 | 8/2006 | Barnum | |
| 2009/0013081 A1 | 1/2009 | Laroia et al. | |
| 2009/0017843 A1 | 1/2009 | Laroia et al. | |
| 2009/0285119 A1* | 11/2009 | Horn et al. | 370/254 |
| 2009/0327391 A1* | 12/2009 | Park et al. | 709/201 |
| 2009/0327395 A1 | 12/2009 | Park et al. | |
| 2010/0081459 A1* | 4/2010 | Bosch et al. | 455/458 |
| 2010/0118834 A1* | 5/2010 | Kalhan | 370/336 |
| 2010/0254308 A1* | 10/2010 | Laroia et al. | 370/328 |
| 2011/0053617 A1* | 3/2011 | Lee | H04W 68/00 455/458 |
| 2011/0058542 A1* | 3/2011 | Nylander et al. | 370/338 |
| 2011/0082940 A1 | 4/2011 | Montemurro et al. | |
| 2011/0098043 A1* | 4/2011 | Yu et al. | 455/435.1 |
| 2011/0106837 A1 | 5/2011 | Walton et al. | |
| 2011/0161697 A1* | 6/2011 | Qi et al. | 713/320 |
| 2011/0200072 A1* | 8/2011 | Hong et al. | 375/130 |
| 2011/0238794 A1* | 9/2011 | Wu et al. | 709/220 |
| 2011/0258313 A1* | 10/2011 | Mallik | H04W 8/005 709/224 |
| 2011/0294474 A1 | 12/2011 | Barany et al. | |
| 2013/0109301 A1* | 5/2013 | Hakola | H04W 76/023 455/39 |
| 2013/0203415 A1* | 8/2013 | Arvidsson et al. | 455/435.1 |
| 2013/0229944 A1 | 9/2013 | Montemurro et al. | |
| 2013/0281146 A1 | 10/2013 | Walton et al. | |
| 2014/0022986 A1 | 1/2014 | Wu et al. | |

* cited by examiner

METHOD OF USING UE DISCOVERY FOR PAGING OPTIMIZATION

RELATED APPLICATIONS

The present application is a continuation-in-part of pending U.S. patent application Ser. No. 13/554,866 filed on Jul. 20, 2012 titled "WAN ASSISTED MONITORING AND COMMUNICATIONS METHODS AND APPARATUS FOR COMMUNICATIONS DEVICES", which is hereby expressly incorporated by reference in its entirety.

FIELD

Various embodiments are directed to paging, and more particularly, to more efficient paging based on utilizing discovery signaling.

BACKGROUND

In the present cellular systems such as long-term evolution (LTE) systems, when an inactive mobile (radio resource control idle state (RRC_IDLE) user equipment (UE) in LTE terminology) is to be paged, a paging message is broadcast by multiple cells in a certain area called a tracking area (TA). The paging message for the idle UE is initialized by a mobility management entity (MME) of the LTE network, which is normally aware that the UE is located within the tracking area but does not know within which macro cell of the tracking area the UE is located. When the UE is not in communication with any base station because the UE is currently idle, it is not possible to locate the macro cell of the tracking area in which the UE is located.

FIG. 1 depicts the situation. In exemplary system 100 of FIG. 1, there are a plurality of macro cells (macro cell 102, macro cell 104, macro cell 106, macro cell 108, macro cell 110, macro cell 112, macro cell 114, macro cell 116, macro cell 118, macro cell 120, macro cell 122, macro cell 124, macro cell 126, macro cell 128, macro cell 130, macro cell 132, macro cell 134, macro cell 136, macro cell 138), and a plurality of corresponding macro cell base stations (macro cell BS 103, macro cell BS 105, macro cell BS 107, macro cell BS 109, macro cell BS 111, macro cell BS 113, macro cell BS 115, macro cell BS 117, macro cell BS 119, macro cell BS 121, macro cell BS 123, macro cell BS 125, macro cell BS 127, macro cell BS 129, macro cell BS 131, macro cell BS 133, macro cell BS 135, macro cell BS 137, macro cell BS 139). The macro base stations are sometimes referred to as eNodeB devices. In system 100 there are also a plurality of mobility management entities (MME 1 161, MME 2 163, MME 3 165). MME 1 161 corresponds to tracking area A 160 which includes macro cells (102, 104, 106, 108, 110, 112); MME 2 163 corresponds to tracking area B 162 which includes macro cells (114, 116, 118, 120, 122, 124); and MME 3 165 corresponds to tracking area C 164 which includes macro cells (126, 128, 130, 132, 134, 136, 138).

Macro cell 132 further includes femto cell base station 141 with corresponding femto cell 140. Exemplary UE device 150 is situated in macro cell 132. Consider the case where UE device 150 is in an idle state of operation, e.g., UE is in RCC_IDLE state.

When the idle UE 150 in tracking area C 164 needs to be paged, the corresponding MME (MME 3 165) normally forwards the page to all the macro base stations, e.g., eNBs, and all the small cell base stations, e.g., femto base stations, in the tracking area C 164. The page is then broadcast by the macro base stations and femto base stations. Thus MME 3 170 sends, e.g., via a backhaul coupling MME 3 165 to the base stations, page signal 170, for paging idle UE 150, to macro base stations (127, 129, 131, 133, 135, 137, 139) and femto base station 141. The base stations (127, 129, 131, 133, 135, 137, 139, 141) generate and transmit page signals (171, 172, 173, 174, 175, 176, 177, 178), respectively, in response to received signal 170 from MME 3 165.

While page signals (174, 178) within cell 132 may be useful, the pages (171, 172, 173, 175, 176, 177) in the cells (126, 128, 130, 134, 136, 138) can be wasteful since the UE 150 is within the coverage area of cell 132 and is camping on the base station 133 and may be out of communication range of the base stations (127, 129, 131, 135, 137, 139) of other cells (126, 128, 130, 134, 136, 138) of tracking area C 164. Thus wireless paging signals (171, 172, 173, 175, 176, 177) may be unnecessary, can waste power and/or air link resources, and/or may generate unnecessary interference.

Based on the above discussion, it would be beneficial if new methods and apparatus were developed which facilitated more efficient paging for idle state UEs, e.g., methods and apparatus which identified a smaller paging area corresponding to an idle state UE.

SUMMARY

Methods and apparatus are described for refining, e.g., reducing, a paging area corresponding to a user equipment device, e.g., a cellular inactive UE device. Various embodiments are well suited for communications systems in which user equipment devices may, and sometimes do, participate in peer to peer communications networks in which direct user device to user device communications are employed. A user equipment device participating in a peer to peer network transmits discovery signals, e.g., peer to peer discovery signals on a peer discovery communications channel. A femto base station and/or a cellular active UE device in the local vicinity of the UE device transmitting the peer to peer discovery signal eavesdrops on the peer discovery signaling and detects the presence of the cellular inactive UE device. The detection of the cellular inactive UE device is reported by a femto cell base station or a cellular active UE device, capable of monitoring peer to peer discovery signals, to a MME. The MME determines a paging area corresponding to the detected UE device based on the reported information and the location of the reporting device. The determined paging area is smaller than the tracking area corresponding to the MME.

An exemplary method of operating a mobility management entity (MME), in accordance with some embodiments, includes receiving from a femto cell base station information identifying a first user equipment (UE) device which transmitted a discovery signal detected by said femto cell base station and updating paging area information corresponding to first UE device to set a paging area to be used to page the first UE device to be a first area. An exemplary mobility management entity (MME), in accordance with some embodiments, includes at least one processor configured to: receive from a femto cell base station information identifying a first user equipment (UE) device which transmitted a discovery signal detected by said femto cell base station; and update paging area information corresponding to first UE device to set a paging area to be used to page the first UE device to be a first area. The exemplary MME further includes memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments, and benefits of various embodiments are discussed in the detailed description which follows.

DETAILED DESCRIPTION

Figure 1:
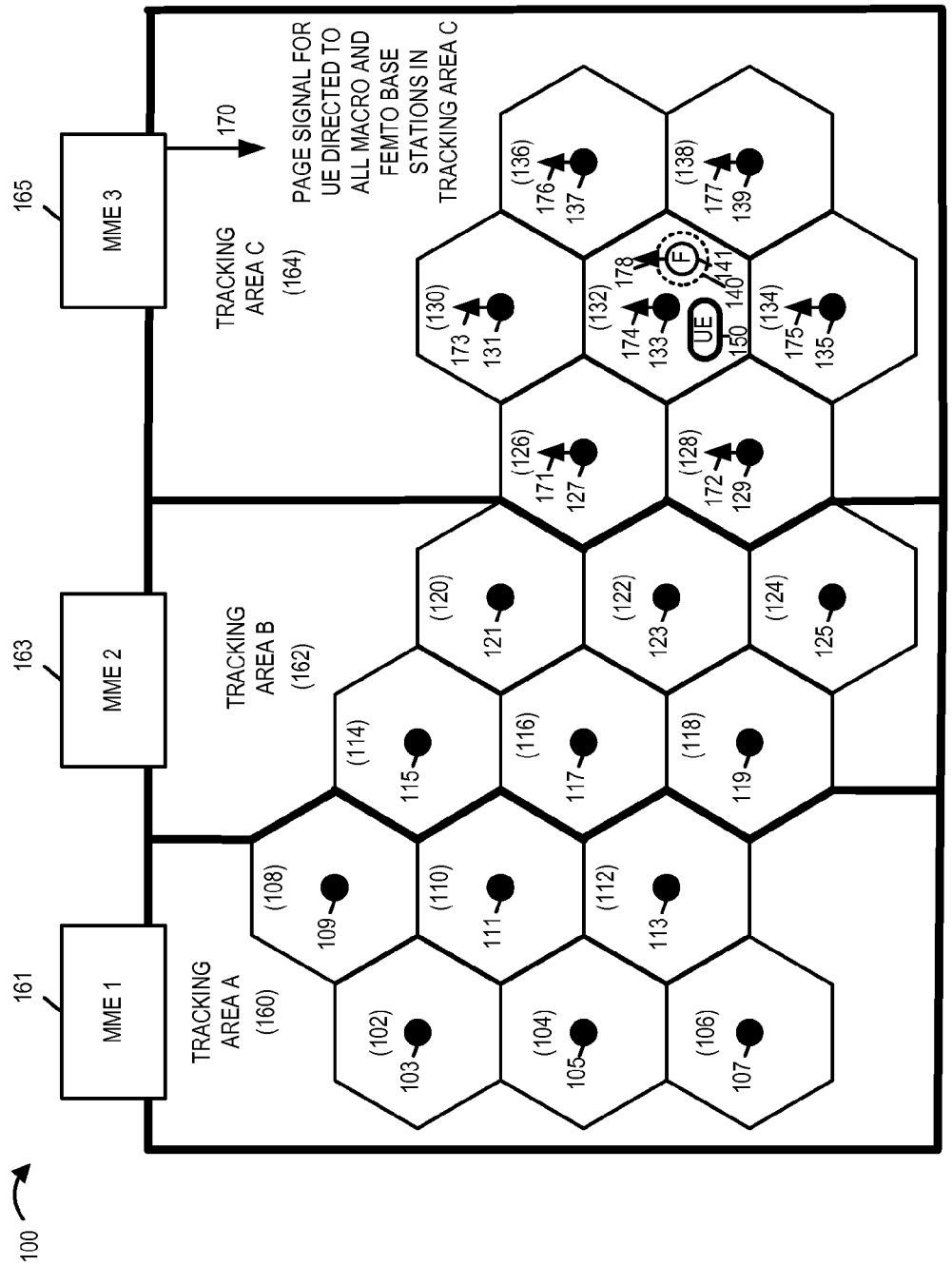
FIG. 1 illustrates a system in which page to an idle UE in a tracking area is broadcast by all macro cell base stations in the tracking area under the direction of a MME.
Figure 2:
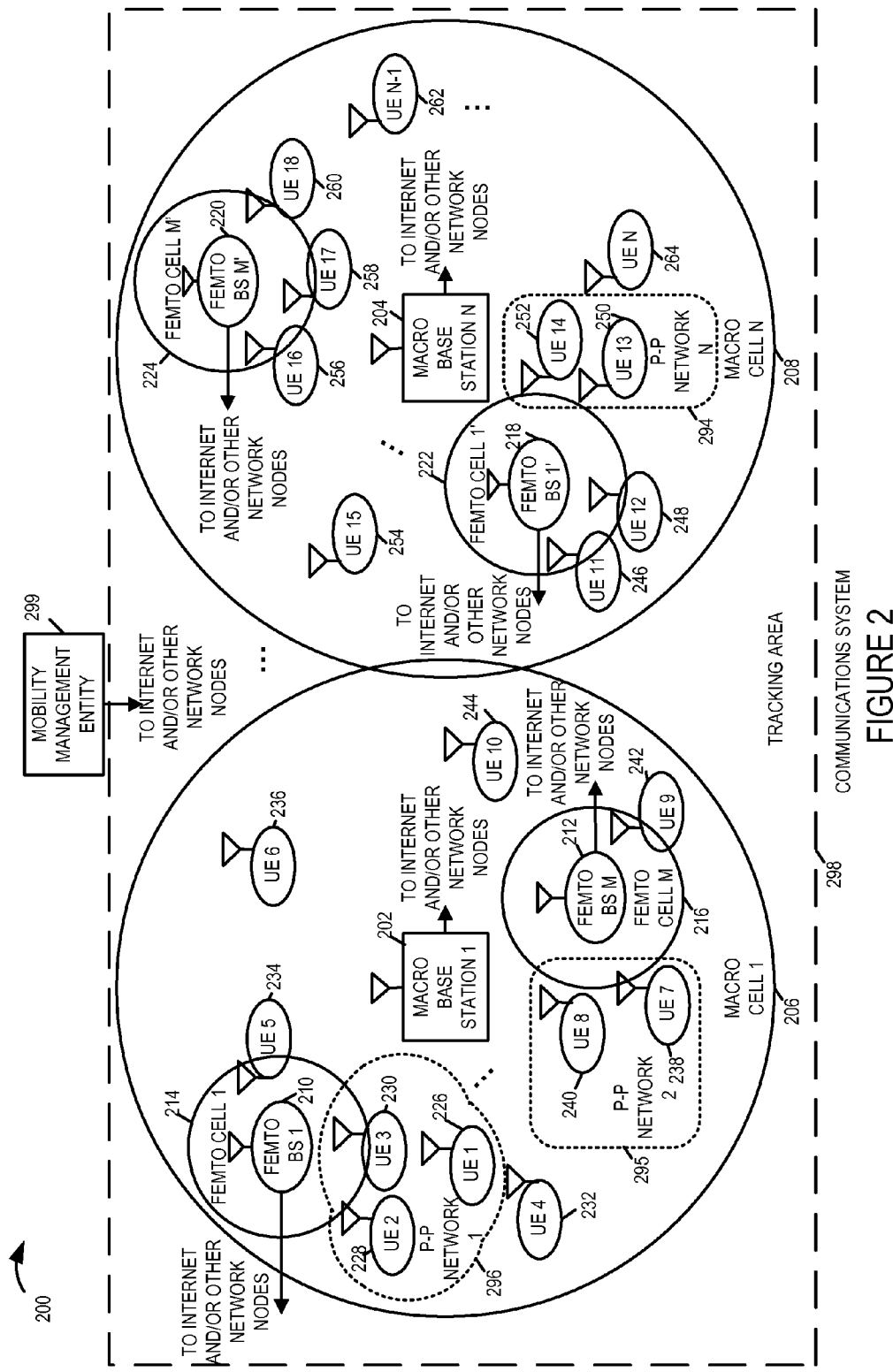
FIG. 2 illustrates an exemplary communications system in accordance with various exemplary embodiments.

FIG. 2 is a drawing of an exemplary communications system 200 in accordance with various embodiments. Exemplary communications system 200 includes a plurality of macro base stations (macro base station 1 202, . . . , macro base station N 204) and a plurality of corresponding macro cells (macro cell 1 206, . . . , macro cell N 208). Within each macro cell, there are a plurality of femto base stations and a plurality of corresponding femto cells. Within macro cell 1 206, there are a plurality of femto base stations (femto base station 1 210, . . . , femto base station M 212) with corresponding femto cells (femto cell 1 214, . . . , femto cell M 216). Similarly, within macro cell N 208, there are a plurality of femto base stations (femto base station 1' 218, . . . , femto base station M' 220) with corresponding femto cells (femto cell 1' 222, . . . , femto cell M' 224). System 200 further includes a plurality of user equipment (UE) devices (UE 1 226, UE 2 228, UE 3 230, UE 4 232, UE 5 234, UE 6 236, UE 7 238, UE 8 240, UE 9 242, UE 10 244, UE 11 246, UE 12 248, UE 13 250, UE 14 252, UE 15 254, UE 16 256, UE 17 258, UE 18 260, . . . , UE (N−1) 262, UE N 264) which may move throughout the system 200 and communicate with a macro base station and/or a femto base station in whose cell it is located. The UE devices (UE 1 226, UE 2 228, UE 3 230, UE 4 232, UE 5 234, UE 6 236, UE 7 238, UE 8 240, UE 9 242, UE 10 244, UE 11 246, UE 12 248, UE 13 250, UE 14 252, UE 15 254, UE 16 256, UE 17 258, UE 18 260, . . . , UE (N−1) 262, UE N 264) further support peer to peer communications, sometimes referred to as device to device communications, in which communications between UE devices need not be via a base station. At different times, different UE devices may be in different modes of operation with regard to cellular communications, and peer to peer communications.

Exemplary communications system 200 further includes a mobility management entity 299 with corresponding tracking area 298. In some embodiments, there are a plurality of mobility management entities and a plurality of corresponding tracking areas. In some embodiments, an MME corresponds to multiple tracking areas. MME 299 is coupled to the macro base station (202, . . . , 204) and the femto base stations (210, . . . , 212, 218, . . . , 220) via a backhaul network. The backhaul network may include wired links, fiber optic links and/or wireless communications links.

Some of the femto base stations in system 200 are at fixed predetermined locations and the locations of those femto base stations are known to the MME 299, e.g., the locations are stored in the MME 299 in a look-up table. Some of the femto base stations in system 200 are at locations which were not known at initial system configuration, e.g., a femto base station may have been added to the system following initial configuration or a femto base station may be mobile and may be installed temporarily at a particular location. In some embodiments, a femto base station, whose location is not known by the MME 299 receives and measures downlink signals from macro base stations in its vicinity and transmits information regarding the detected macro base station signals, e.g., identification information, time of arrival and signal strength information to the MME 299. The transmitted information is used by the MME to determine the location of the femto base station. In some embodiments, a femto base station, whose location is unknown to the MME 299, obtains its location information and transmits its location information to the MME 299. In some embodiments, the femto base station obtains its location via a positioning technique such as, e.g., GPS or trilateration with the macro base stations.

System 200 further includes a plurality of peer to peer networks supporting device to device communications in which signals from a user equipment device are communicated to another user equipment device in a local vicinity without traversing a base station. In some embodiments, the number and/or location of peer to peer networks varies over time. In the example, of FIG. 2, exemplary peer to peer network 1 296, exemplary peer to peer network 2 295, and exemplary peer to peer network N 294 are shown.

In the example of FIG. 2, consider that UE device 1 226, UE device 2 228 and UE device 3 230 are part of peer to peer network 1 296. Further consider that UE device 8 240 and UE device 7 238 are part of peer to peer network 2 295. Further consider that UE device 14 252 and UE device 13 250 are part of peer to peer network N 294. Further consider that UE devices (226, 228, 230, 238, 237, 252, and 259) are in an inactive state with regard to macro cellular communications and femto cellular communications.

Consider that UE device 4 232, UE device 6 236 and UE device 10 244 are in an active state (e.g. RRC_CONNECTED state in LTE) with regard to cellular communications and communicate wireless cellular signals via macro base station 1 202. Consider that UE device 5 234 is in an active state with regard to cellular communications and communicates wireless cellular signals with femto cell base station 1 210. Consider that UE device 9 242 is in an active state with regard to cellular communications and communicates wireless cellular signals with femto cell base station M 212.

Consider that UE device 15 254, UE device N-1 262 and UE device N 264 are in an active state with regard to cellular communications and communicate wireless cellular signals via macro base station N 204. Consider that UE device 11 246 and UE device 12 248 are in an active state with regard to cellular communications and communicates wireless cellular signals with femto cell base station 1' 218. Consider that UE device 16 256, UE device 17 258 and UE device 18 260 are in an active state with regard to cellular communications and communicates wireless cellular signals with femto cell base station M' 220.

The UE device (228, 230, 226, 240, 238, 252, 250) which are participating in a peer to peer network transmit peer to peer discovery signals, e.g., on a peer to peer communications channel. Femto base stations in the vicinity of a UE device which is transmitting peer to peer discovery signals eavesdrop on the peer to peer signaling, receiving, decoding and measuring peer to peer discovery signals. In various embodiments, the femto base station need not be, and in some embodiments is not part of the peer to peer network. Active UE devices with regard to the cellular communications in the vicinity of a UE device which is transmitting peer to peer discovery signals eavesdrop on the peer to peer signaling, receiving, decoding and measuring peer to peer discovery signals. In various embodiments, the UE device which is macro cellular active need not be, and in some embodiments is not part of the peer to peer network. In some embodiments the femto cell base stations and the active cellular UEs are part of the peer to peer network and decode the peer to peer discovery signals as part of operations of the peer to peer network.

In this example, femto base station 1 210 receives, decodes and measures peer to peer discovery signals transmitted by cellular inactive UE devices UE 2 228 and UE 3 230. Femto base station 1 210 reports information regarding detected UE 2 228 to MME 299. The reported information is used by MME 299 to determine the location of inactive UE 2 228 to within an area and refine a paging area to be used when paging UE 2 device 228. Femto base station 1 210 reports information regarding detected UE 3 230 to MME 299. The reported information is used by MME 299 to determine the location of inactive UE 3 230 and refine a paging area to be used when paging UE 3 device 230. The information reported by the femto base station, includes, e.g., one or more or all of: the identity of the inactive UE, the received signal strength of the peer to peer signal (e.g. discovery signal) detected, transmit power used by the cellular inactive UE to transmit peer to peer signal, time of arrival of the peer to peer signal, resource used by the inactive UE to transmit peer to peer discovery signal.

Macro cellular active UE 4 232 receives, decodes and measures peer to peer discovery signals transmitted by cellular inactive UE device UE 1 226. Macro cellular active UE device 4 232 reports information regarding detected UE 1 226 to MME 299. The reported information is used by MME 299 to determine the position of inactive UE 1 226 and refine a paging area to be used when paging UE device 1 226. MME 299 may, and sometimes does, combine information regarding a detected inactive UE reported by multiple femto cell base stations and/or cellular active UEs to refine the location of the inactive UE and further refine the paging area of the inactive UE.

In this example, femto base station M 212 receives, decodes and measures peer to peer discovery signals transmitted by cellular inactive UE devices UE 8 240 and UE 7 238. Femto base station M 212 reports information regarding detected UE 8 240 to MME 299. The reported information is used by MME 299 to determine the position of inactive UE 8 240 and refine a paging area to be used when paging UE device 8 240. Femto base station M 212 reports information regarding detected UE 7 238 to MME 299. The reported information is used by MME 299 to determine the position of inactive UE 7 238 and refine a paging area to be used when paging UE device 7 238.

Femto base station 1' 218 receives, decodes and measures peer to peer discovery signals transmitted by cellular inactive UE devices UE 14 252 and UE 13 250. Femto base station 1' 218 reports information regarding detected UE 14 252 to MME 299. The reported information is used by MME 299 to determine the position of inactive UE 14 252 and refine a paging area to be used when paging UE device 14 252. Femto base station 1' 218 reports information regarding detected UE 13 250 to MME 299. The reported information is used by MME 299 to determine the position of inactive UE 13 250 and refine a paging area to be used when paging UE device 13 250.

Macro cellular active UE N 264 receives, decodes and measures peer to peer discovery signals transmitted by cellular inactive UE devices (UE 14 252, UE 13 250). Macro cellular active UE device N 264 reports information regarding detected UE 14 252 to MME 299. The reported information is used by MME 299 is further determine the position of inactive UE 14 252 and further refine a paging area to be used when paging UE device 14 252. Macro cellular active UE device N 264 reports information regarding detected UE 13 250 to MME 299. The reported information is used by MME 299 is further determine the position of inactive UE 13 250 and further refine a paging area to be used when paging UE device 13 250.

In some embodiments, macro base station further monitor for peer to peer discovery signals and report information regarding detected cellular inactive UEs to MME 299.

Figure 3:
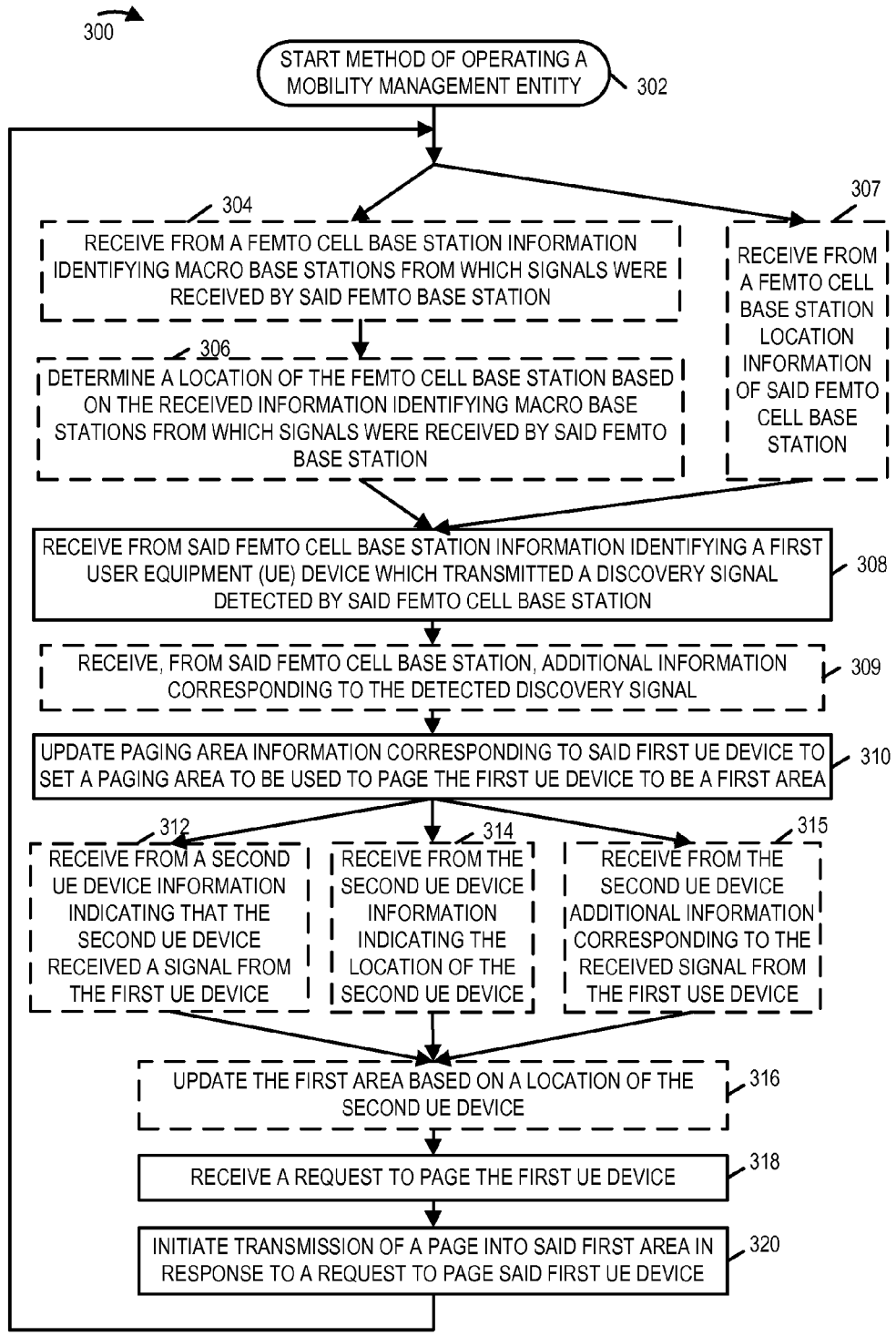
FIG. 3 is a flowchart of an exemplary method of operating an exemplary mobility management entity (MME) in accordance with various exemplary embodiments.

FIG. 3 is a flowchart 300 of an exemplary method of operating a mobility management entity (MME) in accordance with various exemplary embodiments. Operation starts in step 302, where the mobility management entity is powered on and initialized. In some embodiments, operation proceeds from step 302 to step 304. In some other embodiments, operation proceeds from step 302 to step 307. In some other embodiments operation proceeds from step 302 to step 308 and bypasses steps 304, 306 and 307.

Returning to step 304, in step 304 the MME receives, from a femto cell base station, information identifying macro base stations from which signals were received by the femto base station. Operation proceeds from step 304 to step 306. In step 306 the MME determines a location of the femto cell base station based on received information identifying macro base stations from which signals were received by the femto base station In some embodiments, the MME also receives additional information from the femto cell base station corresponding to macro base stations, e.g., received signal strengths of the downlink signals of the macro base stations and/or time of arrival of the signals from macro base stations. In some such embodiments, the MME uses the additional information corresponding to the macro base stations in determining the location of the femto cell base station. Operation proceeds from step 306 to step 308.

Returning to step 307, in step 307 the MME receives from a femto cell base station location information of the femto cell base station. In some such embodiments, the femto cell base station obtains its location via a positioning technique such as, e.g., GPS or trilateration with the macro base stations, and the femto cell base station transmits its determined position to the MME.

In step 308 the MME receives from said femto base station information identifying a first user equipment (UE) device which transmitted a discovery signal, e.g., a peer to peer discovery signal, detected by said femto base station. In some embodiments, the discovery signal is a device to device discovery signal. In some embodiments, the discovery signal is a device to device traffic signal. In some embodiments, the device to device discovery signal is received during a period of time in which said first UE device does not have an active connection with a macro base station, e.g., an eNodeB, or a femto base station.

In some embodiments, the discovery signal was transmitted on a discovery channel which is not used for discovery of devices operating in a cellular mode of operation, e.g., a mode in which a UE device communicates with a base station of macro cell. For example, the discovery channel is a peer to peer discovery channel.

In some embodiments, operation proceeds from step 308 to step 310. In other embodiments, operation proceeds from step 308 to step 309. In step 309 the MME receives, from said second femto cell base station, additional information corresponding to the detected discovery signal. In some such embodiments, said additional information corresponding to the detected discovery signal includes at least one of: a received power of the discovery signal, a transmit power of the discovery signal, or an identity of a resource on which the discovery signal was detected. In some embodiments, the additional information corresponding to the detected discovery signal includes information about the received discovery signal, e.g., received signal strength, time of arrival, transmit power of the discovery signal.

In step 310 the MME updates paging area information corresponding to said first UE device to set a paging area to be used to page the first UE device to be a first page area. In various embodiments, the update of step 310 is based on information received in step 308 and/or step 309 and the location of the femto cell base station. In various embodiments, the first area includes the femto cell base station. In various embodiments, the first area is smaller than an area which is used to page said first device when a femto base station has not reported detection of a discovery signal corresponding to said first UE device to said MME.

In some embodiments, operation proceeds from step 310 to step 318 and bypasses steps 312, 314, and 315. In some other embodiments, operation proceeds from step 310 to step 312 and bypasses one or both of steps 314 and 315. In still other embodiments, operation proceeds from step 310 to steps 312 and to one or both of steps 314 and 315. Returning to step 312, in step 312 the MME receives, e.g., via base station forwarding, from a second UE device information indicating that the second UE device received a signal, e.g., a discovery signal, from the first UE device. In some such embodiments, the second UE device does not have an active connection with the first UE device. Operation proceeds from step 312 to step 316. Returning to step 314, in step 314 the MME receives, e.g., via base station message forwarding, from the second UE device information indicating the location of the second UE device. In some embodiments, the second UE device, e.g., a device including a GPS receiver, knows and reports its location along with the received signal information. In some embodiments, the location of the second UE device is determined externally to the second UE device and reported to the MME device by another device, e.g., a base station with which the second device has an active connection. Operation proceeds from step 314 to step 316. Returning to step 315, in step 315 the MME receives, e.g., via base station message forwarding, from the second UE device additional information corresponding to the received signal from the first UE device. In some embodiments, said additional information corresponding to the received signal from the first UE device includes at least one of: a received power of the received signal from the first UE device, a transmit power of the received signal from the first UE device, or an identity of a resource on which the received signal from the first UE device signal was detected. In some embodiments, the additional information corresponding to the received signal from the first UE device includes information about the received signal, e.g., received signal strength, time of arrival, transmit power of the signal. Operation proceeds from step 315 to step 316.

In step 316, the MME updates the first area based on a location of the second UE device. In some embodiments, in step 316, the MME updates the first area based on the location of the second device and said received additional information corresponding to the received signal from the first UE device by the second UE device. Thus, in step 316 the first area is updated, e.g., refined based on the signal transmitted from the first UE device which was detected by the second UE device and reported to the MME. Operation proceeds from step 316 to step 318.

In step 318, the MME receives a request to page the first UE device. Operation proceeds from step 318 to step 320. In step 320, the MME initiates transmission of a page, i.e., paging signal, into said first area in response to the request to page said first device. Operation proceeds from step 320 to the input to step 304.

In some embodiments, the femto cell base station is at a known location relative to a macro base station, e.g., a predetermined fixed known location which is stored in the memory of the MME. In some such embodiments, the steps 304, 306, and 307 are not performed and are bypassed.

In some embodiments, the reporting femto base station's location is known initially by the MME but can be, and sometimes is, determined based on the known locations of macro base stations and what macro base stations are heard by the reporting femto base station. In some such embodiments, steps 304 and 306 are performed.

Figure 4:
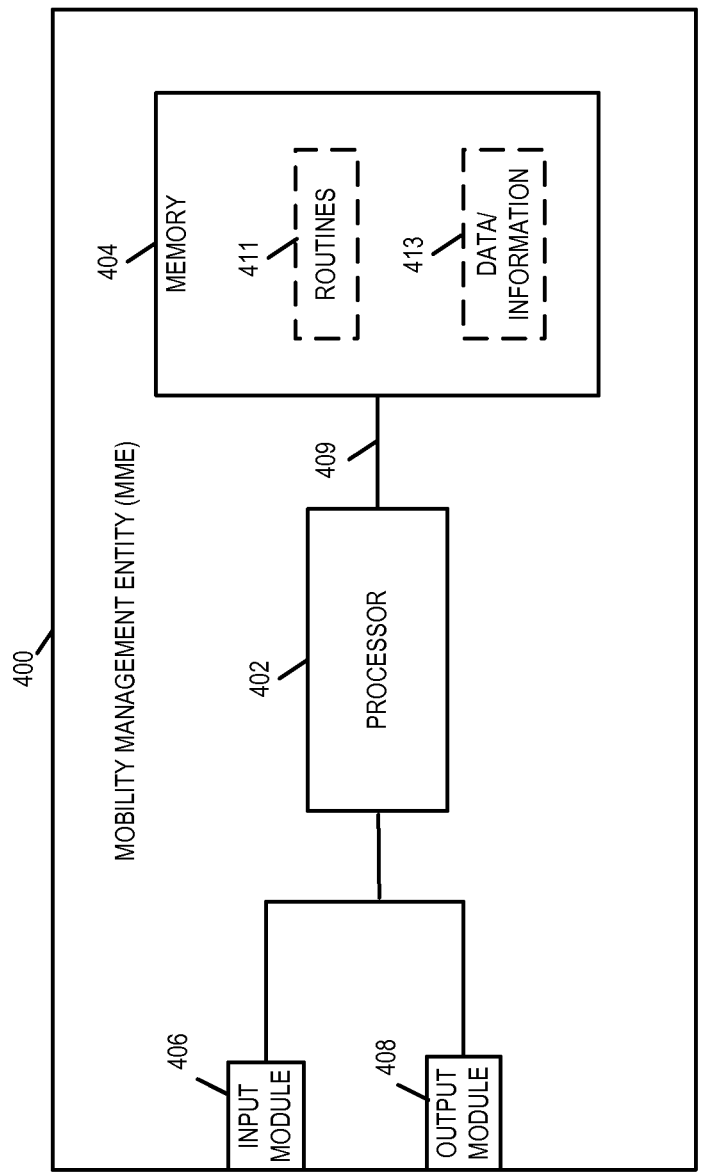
FIG. 4 is a drawing of an exemplary mobility management entity (MME) in accordance with various exemplary embodiments.

FIG. 4 is a drawing of a mobility management entity (MME) 400 in accordance with various exemplary embodiments. Exemplary MME 400 is, e.g., one of the MMEs of system 200 of FIG. 2. Exemplary MME 400 may, and sometimes does, implement a method in accordance with flowchart 300 of FIG. 3.

MME 400 includes a processor 402 and memory 404 coupled together via a bus 409 over which the various elements (402, 404) may interchange data and information. MME 400 further includes an input module 406 and an output module 408 which may be coupled to processor 402 as shown. However, in some embodiments, the input module 406 and output module 408 are located internal to the processor 402. Input module 406 can receive input signals. Input module 406 includes a wired and/or optical input interface for receiving input. In some embodiments, input module 406 further includes a wireless receiver for receiving input. Output module 408 includes a wired and/or optical output interface for transmitting output. In some embodiments, output module 408 further includes a wireless transmitter for transmitting output. In some embodiments, memory 404 includes routines 411 and data/information 413.

In some embodiments, processor 402 is configured to: receive from a femto cell base station information identifying a first user equipment (UE) device which transmitted a discovery signal, e.g. a peer to peer discovery signal, detected by said femto cell base station; and update paging area information corresponding to first UE device to set a paging area to be used to page the first UE device to be a first area.

In some embodiments, processor 402 is further configured to receive from said femto cell base station additional information corresponding to the detected discovery signal. In some such embodiments, said additional information corresponding to the detected discovery signal includes at least one of: a received power of the discovery signal, a transmit power of the discovery signal, or an identity of a resource on which the discovery signal was detected.

In various embodiments, said first area includes said femto cell base station. In some such embodiments, said first area is smaller than an area which is used to page said first UE device when a femto cell base station has not reported detection of a discovery signal corresponding to said first UE device to said MME.

In some embodiments, said femto cell base station is at a known location relative to a macro base station. In some such embodiments, the MME stores location information corresponding to the location of the femto base station.

In some embodiments, the reporting femto cell base station's location is not known to the MME but can be, and sometimes is, determined based on the known locations of macro base stations and what macro base stations are heard by the reporting femto cell base station.

In some embodiments, processor 402 is further configured to: receive, from said femto cell base station, information identifying macro base stations from which signals were received by said femto cell base station. In some such embodiments, processor 402 is further configured to: determine a location of said femto cell base station based on the received information identifying macro base stations from which signals were received by said femto cell base station. In some embodiments, processor 402 is configured to receive from said femto cell base station location information of said femto cell base station. In some embodiments, the femto cell base station determines its location, e.g., based on received GPS signals, and transmits its location information to the MME.

In some embodiments, the discovery signal is a device-to-device discovery signal. The device to device discovery signal is sometimes referred to as a peer to peer discovery signal. In some embodiments, the device-to-device discovery signal is received during a period of time in which said first UE device does not have an active connection with a macro base station, e.g., an eNodeB, or a femto base station.

In various embodiments, processor 402 is configured to: receive, e.g., indirectly via a base station, from a second UE device information indicating that the second UE device received a signal, e.g., discovery signal, from the first UE device. In various embodiments, the second UE device does not have an active connection with the first UE device. In some embodiments, processor 402 is configured to update the first area based on a location of the second UE device. Thus, in some embodiments, the paging area for the first UE device may be, and sometimes is, determined based on both information reported to the MME from a femto cell base station and information reported to MME from the a second UE device. In some cases, the second UE device knows and reports its location along with the received signal information, and processor 402 is configured to receive the location information corresponding to the second device. In some embodiments, processor 402 is configured to receive from said second UE device additional information corresponding to received signal from the first UE device. In some such embodiments, said additional information corresponding to the received signal from the first UE device includes at least one of: a received power of the signal from the first UE device, a transmit power of the signal from the first UE device, or an identity of a resource on which the signal from the first UE device was detected. In some such embodiments, processor 402 is configured to use said received additional information corresponding to received signal from the first UE device in determining the paging area for the first UE device.

In various embodiments, processor is configured to receive a request to page said first UE device. In some such embodiments, processor 402 is further configured to initiate transmission of a page into said first area in response to a request to page said first UE device.

In some embodiments, the discovery signal was transmitted on a discovery channel which is not used for discovery of devices operating in a cellular mode of operation, e.g., a mode in which a UE device communicates with a base station of a macro cell. In some embodiments, the discovery channel is a peer to peer discovery channel.

In various embodiments, a femto base station eavesdrops on discovery signaling transmitted from UE devices, e.g., peer to peer discovery signaling occurring in its local vicinity. The femto base station performing the eavesdropping need not be, and in various embodiments, is not part of the peer to peer communications network. The UE device transmitting the peer to peer discovery signal may be, and sometimes is, in an inactive state with regard to the cellular network, e.g., the UE device may be a cellular inactive mobile, e.g. an RRC_IDLE UE device.

In various embodiments, a UE device in an active cellular state, e.g. an RRC_CONNECTED UE device, eavesdrops on discovery signaling transmitted from inactive state cellular UE devices, e.g., peer to peer discovery signaling occurring in it local vicinity. The UE device in the active cellular state performing the eavesdropping need not be, and in various embodiments, is not part of the peer to peer communications network.

Thus a femto base and/or a UE device in active cellular state, e.g., a UE device with an active connection with a macro base station, may, and sometimes does, eavesdrop on peer to peer discovery signaling being transmitted by a cellular inactive UE device and report information on the inactive UE device to the MME. The reported information is used by the MME to locate the cellular inactive UE and reduce a paging area corresponding to the cellular inactive UE.

Figure 5:
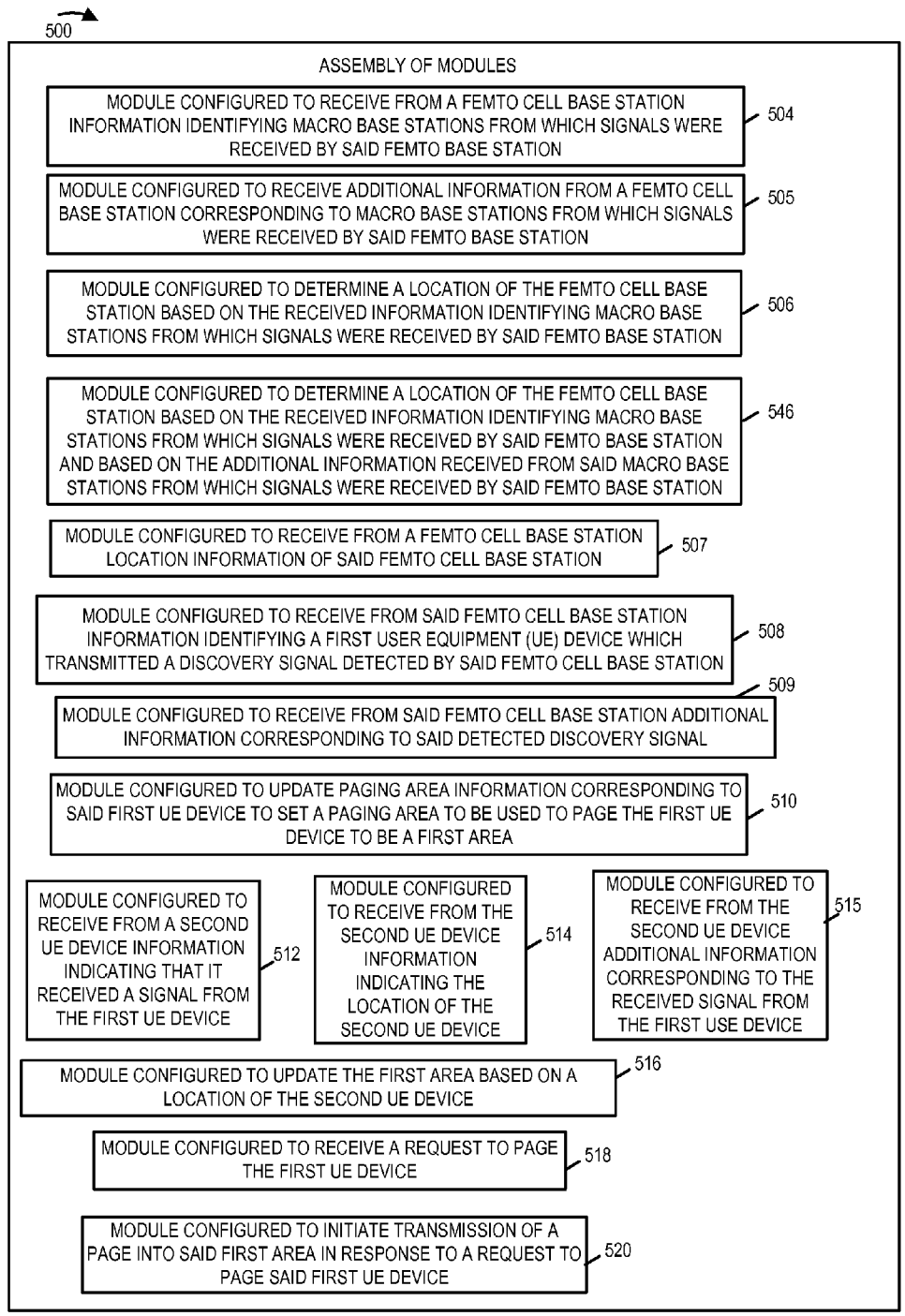
FIG. 5 is a drawing of an assembly of modules, which can, and in some embodiments is, used in the exemplary MME illustrated in FIG. 5.

FIG. 5 is a drawing illustrating an assembly of modules 500, which can, and in some embodiments is, used in the exemplary MME 400 illustrated in FIG. 4. The modules in the assembly 500 can be implemented in hardware within the processor 402 of FIG. 4, e.g., as individual circuits. Alternatively, the modules may be implemented in software and stored in the memory 404 of MME 400 shown in FIG. 4. In some such embodiments, the assembly of modules 500 is included in routines 411 of memory 404 of MME 400 of FIG. 4. While shown in the FIG. 4 embodiment as a single processor, e.g., computer, it should be appreciated that the processor 402 may be implemented as one or more processors, e.g., computers. When implemented in software the modules include code, which when executed by the processor, configure the processor, e.g., computer, 402 to implement the function corresponding to the module. In some embodiments, processor 402 is configured to implement each of the modules of the assembly of modules 500. In some embodiments where the assembly of modules 500 is stored in the memory 404, the memory 404 is a computer program product comprising a computer readable medium, e.g., a non-transitory computer readable medium, comprising code, e.g., individual code for each module, for causing at least one computer, e.g., processor 402, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 5 control and/or configure the MME 400 or elements therein such as the processor 402, to perform the functions of the corresponding steps illustrated and/or described in the method of flowchart 300 of FIG. 3.

Assembly of modules 500 includes a module 504 configured to receive from a femto cell base station information identifying macro cell base stations from which signals were received by said femto cell base station, a module 505 configured to receive from a femto cell base station additional information, e.g., information communicating received signal strengths of the received downlink signals of the macro base stations and/or time of arrival of the signals from macro base stations, corresponding to macro cell base stations from which signals were received by said femto cell base station, a module 506 configured to determine a location of the femto cell base station based on the received information identifying macro base stations from which signals were received by said femto base station, a module 546 configured to determine a location of the femto cell base station based on the received information identifying macro base stations from which signals were received by said femto base station and based on the additional information corresponding to the macro base stations from which signals were received by said femto base station, and a module 507 configured to receive from a femto cell base station location information of the femto cell base station.

Assembly of modules 500 further includes a module 508 configured to receive from said femto base station information identifying a first user equipment (UE) device which transmitted a discovery signal, e.g., a peer to peer discovery signal, detected by said femto base station, a module 509 configured to receive from said femto cell base station additional information corresponding to the detected discovery signal, and a module 510 configured to update paging area information corresponding to said first UE device to set a paging area to be used to page the first UE device to be a first area. In some embodiments, module 510 is configured to update paging area information corresponding to said first UE device to set a paging area to be used to page the first UE device to be a first area based on the received information from the femto cell base station identifying the first UE device which transmitted the detected discovery signal and the location of the femto cell base station. In some embodiments, module 510 is configured to update paging area information corresponding to said first UE device to set a paging area to be used to page the first UE device to be a first area based on the received information from the femto cell base station identifying the first UE device which transmitted the detected discovery signal, the received additional information from the femto cell base station corresponding to the detected discovery signal, and the location of the femto cell base station. In some embodiments the discovery signal is a device to device discovery signal. In some such embodiments, the device to device discovery signal is received during a period of time in which said first UE device, which transmitted the discovery signal, does not have an active connection with a macro base station or a femto base station. In some embodiments, the discovery signal was transmitted on a discovery channel which is not used for discovery of devices operating in a cellular mode of operation, e.g., a mode in which the UE device communicates with a base station of a macro cell. In various embodiments the discovery channel is a peer to peer discovery channel.

In some embodiments, the first area includes said femto cell base station. In various embodiments, the first area is smaller than an area which is used to page the first UE device when a femto cell base station has not reported detection of a discovery signal corresponding to said first UE device to said MME.

Assembly of modules 500 further includes a module 512 configured to receive from a second UE device information indicating that the second UE device received a signal from the first UE device, a module 514 configured to receive from the second UE device information indicating the location of the second UE device, a module 515 configured to receive from said second UE device additional information corresponding to the received signal from the first UE device, and a module 516 configured to update the first area based on a location of the second UE device. In some embodiments, module 516 is configured to update the first area, based on both the location of the second device and the additional information corresponding to the received signal from the first UE device. Assembly of modules 500 further includes a module 518 configured to receive a request to page the first UE device, and a module 520 configured to initiate transmission of a page into said first area in response to a request to page said first UE device.

In some such embodiments, a reporting femto base station is at a known location relative to a macro base station, e.g., a predetermined fixed known location stored in the MME. For that particular reporting femto base station, modules 504 and 506 need not be executed to determine the femto base station's positions since it is already known by the MME. In some embodiments, a reporting femto base station's location may not be known by the MME, and modules 504 and 506 are used to determine the location of the reporting femto base station.

Figure 6:
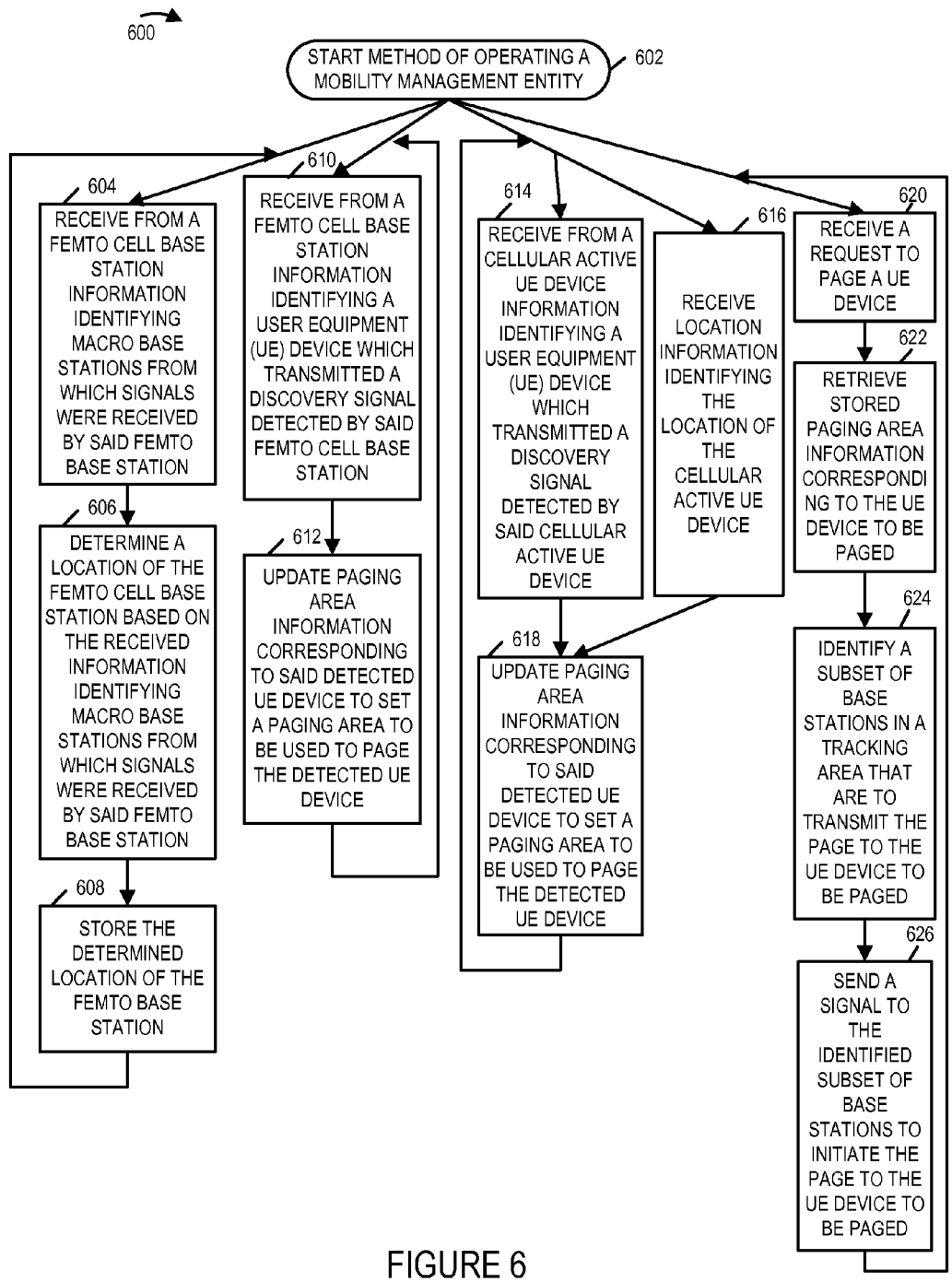
FIG. 6 is a flowchart of an exemplary method of operating an exemplary mobility management entity (MME) in accordance with various exemplary embodiments.

FIG. 6 is a flowchart 600 of an exemplary method of operating a mobility management entity (MME) in accordance with various exemplary embodiments. The MME is, e.g., a MME of system 200 of FIG. 2. Operation starts in step 602 in which the MME is powered on and initialized. Operation proceeds from step 602 to steps 604, 610, 614, 616 and 620. In step 604 the MME receives from a femto cell base station, e.g., a femto base station located somewhere within its tracking area, information identifying macro base stations from which signals were received by the femto cell base station. Information received by the MME includes, e.g., femto cell base station ID information and a set macro cell base stations IDs. In some embodiments, the information received by the MME further includes received signal strength measurements corresponding to macro base station transmitted signals which were detected and measured by the femto base station. Operation proceeds from step 604 to step 606, in which the MME determines a location of the femto cell base station based on the received information identifying macro base stations from which signals were received. Operation proceeds from step 606 to step 608. In step 608, the MME stores the determined location of the femto base station. Operation proceeds from step 608 to step 604, in which the MME may receive signals from another femto base station which is located within its tracking area and which the location of the femto base station is to be determined.

Returning to step 610, in step 610 the MME receives from a femto cell base station information identifying a user equipment (UE) device which transmitted a discovery signal, e.g., a peer to peer discovery signal, detected by said femto base station. In some embodiments, a peer to peer discovery signal is referred to alternatively as a device to device discovery signal. Operation proceeds from step 610 to step 612, in which the MME updates paging area information corresponding to said detected UE device to set a paging area to be used to page the detected UE device. In various embodiments, the default paging area for a UE device is the entire tracking area of the MME, and in step 612 the paging area for the detected UE device is refined, e.g., reduced to cover a smaller area than the entire tracking area, based on the detected peer to peer discovery signal and the predetermined known or determined location of the femto base station which received the detected signal. In various embodiments, the refined paging area for the UE device includes the location of the femto cell base station which detected the discovery signal.

In various embodiments the detected UE device which transmitted the discovery signal is in an inactive state with regard to macro cellular communications and femto cellular communications. In some embodiments, the femto cell base station which detected the peer to peer discovery signal is not part of the peer to peer network but is eavesdropping on the peer to peer signaling occurring in the peer to peer network.

Operation proceeds from step 612 to step 610, in which the MME receives information identifying a UE device which transmitted a discovery signal from the same or another femto cell base station. The UE device which transmitted the detected discovery signal, e.g., a peer to peer discovery signal, may be the same or a different UE device from the last iteration of steps 610 and step 612.

Returning to step 614 and step 616, in step 614 the MME receives from a cellular active UE device, via a base station, information identifying a user equipment device which transmitted a discovery signal, e.g., a peer to peer discovery signal, detected by said cellular active UE device. In step 616 the MME receives location information identifying the location of the cellular active UE device referred to in step 616. In some embodiments, the cellular active UE device determines its own location, e.g., via an embedded GPS module, and communicates its position to the MME. In other embodiments, a base station or other network node determines the location of the cellular active UE and communicates the location information to the MME. Operation proceeds from steps 614 and 616 to step 618.

In step 618 the MME updates paging area information corresponding to said detected UE device, referred to in step 614, to set a paging area to be used to page the detected UE device. In various embodiments, the default paging area for a UE device is the entire tracking area of the MME, and in step 618 the paging area for the detected UE device is refined, e.g., reduced, to cover a smaller area than the entire tracking area, based on the detected peer to peer discovery signal and the location of the cellular active UE device which received the detected signal. In various embodiments the detected UE device which transmitted the discovery signal is in an inactive state with regard to macro cellular communications and femto cellular communications. In some embodiments, the cellular active UE device which detected the peer to peer discovery signal is not part of the peer to peer network but is eavesdropping on the peer to peer discovery signaling occurring in the peer to peer network.

Operation proceeds from step 618 to step 614 and step 616. In step 614, the MME receives from the same or another cellular active UE device information identifying a UE device which transmitted a discovery signal. The UE device which transmitted the detected discovery signal, e.g., a peer to peer discovery signal, may be the same or a different UE device from the last iteration of steps 614, 616 and 618.

It should be appreciated that the paging area for a cellular inactive UE device may be refined, e.g., reduced, from the default tracking area, based on peer to peer discovery information detected by both a femto cell base station and a cellular active UE device, e.g., in combination.

Returning to step 620, in step 620 the MME receives a request to page a user equipment device. Operation proceeds from step 620 to step 622. In step 622, the MME retrieves stored paging area information corresponding to the UE device to be paged. Consider that the UE device is a cellular inactive UE device. The stored paging area information may, and sometimes does, identify a smaller area than the default paging area based on updates in one or more of steps 612 and step 618. Operation proceeds from step 622 to step 624.

In step 624, the MME identifies a subset of base stations in a tracking area that are to transmit the page to the UE device to be paged. In some embodiments, the subset of base stations includes one or more macro base stations in an identified area paging corresponding to the UE device to be paged but not does include any femto base stations in the identified area. In some embodiments, the subset of base stations includes a macro base station and a femto base station in an identified area paging corresponding to the UE device to be paged. In some embodiments, the subset of base station includes one femto base station in an identified area paging corresponding to the UE device to be paged but not does include any macro base stations in the identified area, e.g., if the UE device to be paged is determined to be very close to a femto base station, e.g., estimated to be able to detect a femto base station page signal with a probability of success above a predetermined limit.

Operation proceeds from step 624 to step 626 in which the MME sends a signal to the identified subset of base stations to initiate the requested page to the UE device to be paged. Operation proceeds from step 626 to step 620, in which the MME receives a page to request a UE device. The UE device that is being requested to be paged may be the same or a different UE device from the last iteration of steps 620, 622, 624, and 626.

Figure 7:
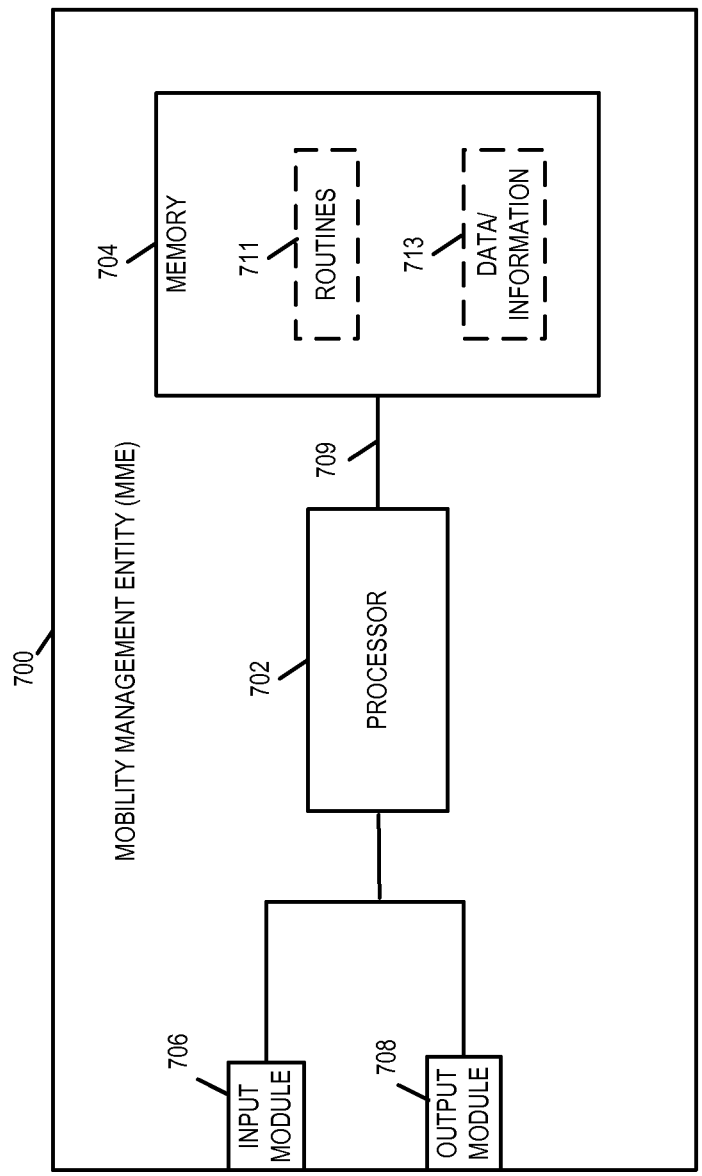
FIG. 7 is a drawing of an exemplary mobility management entity (MME) in accordance with various exemplary embodiments.

FIG. 7 is a drawing of a mobility management entity (MME) 700 in accordance with various exemplary embodiments. Exemplary MME 700 is, e.g., one of the MMEs of system 200 of FIG. 2. Exemplary MME 700 may, and sometimes does, implement a method in accordance with flowchart 600 of FIG. 6.

MME 700 includes a processor 702 and memory 704 coupled together via a bus 709 over which the various elements (702, 704) may interchange data and information. MME 700 further includes an input module 706 and an output module 708 which may be coupled to processor 702 as shown. However, in some embodiments, the input module 706 and output module 708 are located internal to the processor 702. Input module 706 can receive input signals. Input module 706 includes a wired and/or optical input interface for receiving input. In some embodiments, input module 706 further includes a wireless receiver for receiving input. Output module 708 includes a wired and/or optical output interface for transmitting output. In some embodiments, output module 708 further includes a wireless transmitter for transmitting output. In some embodiments, memory 704 includes routines 711 and data/information 713.

Figure 8:
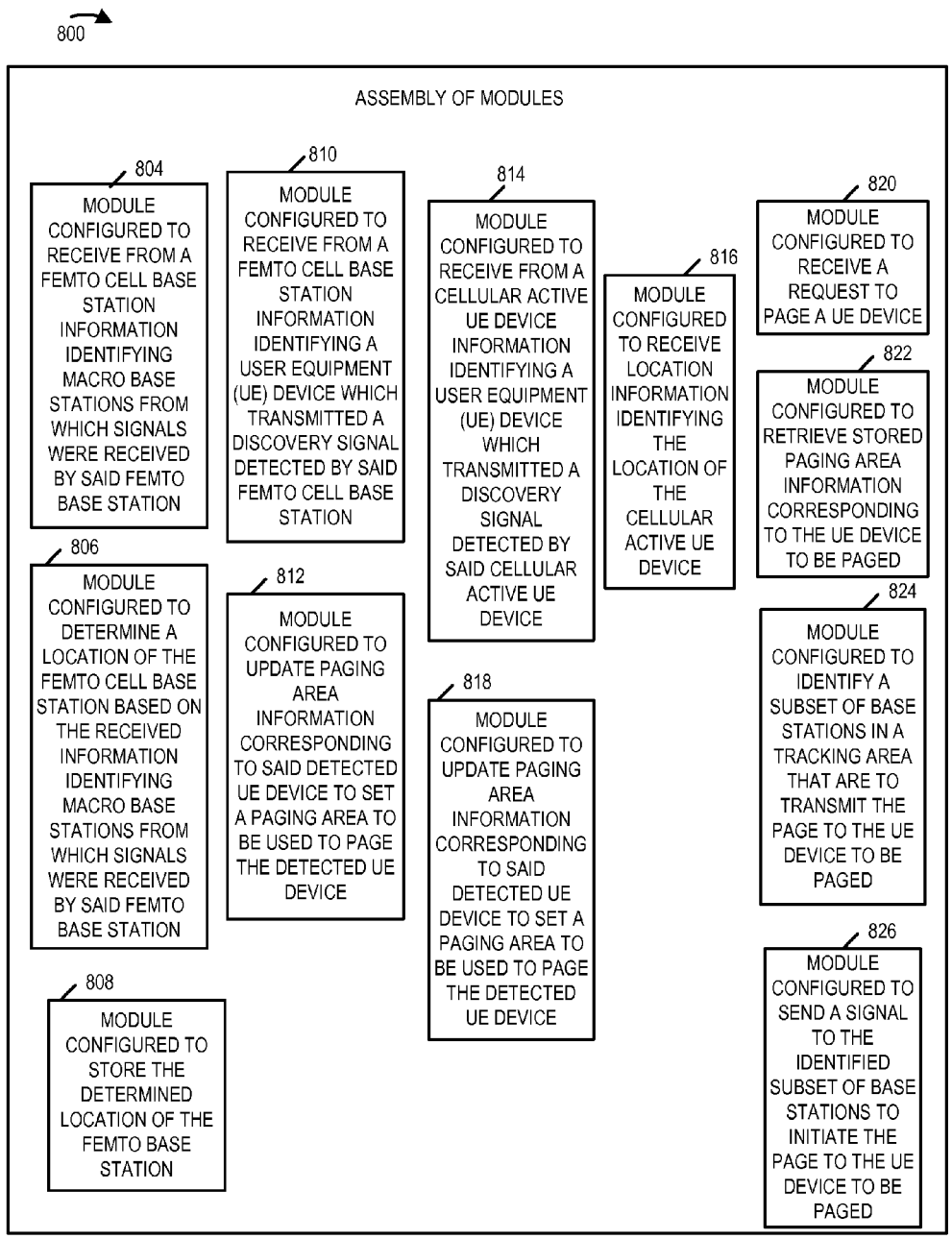
FIG. 8 is a drawing of an assembly of modules, which can, and in some embodiments is, used in the exemplary MME illustrated in FIG. 7.

FIG. 8 is a drawing illustrating an assembly of modules 800, which can, and in some embodiments is, used in the exemplary MME 700 illustrated in FIG. 7. The modules in the assembly 800 can be implemented in hardware within the processor 702 of FIG. 7, e.g., as individual circuits. Alternatively, the modules may be implemented in software and stored in the memory 704 of MME 700 shown in FIG. 7. In some such embodiments, the assembly of modules 800 is included in routines 811 of memory 704 of MME 700 of FIG. 7. While shown in the FIG. 7 embodiment as a single processor, e.g., computer, it should be appreciated that the processor 702 may be implemented as one or more processors, e.g., computers. When implemented in software the modules include code, which when executed by the processor, configure the processor, e.g., computer, 702 to implement the function corresponding to the module. In some embodiments, processor 702 is configured to implement each of the modules of the assembly of modules 800. In some embodiments where the assembly of modules 800 is stored in the memory 704, the memory 704 is a computer program product comprising a computer readable medium, e.g., a non-transitory computer readable medium, comprising code, e.g., individual code for each module, for causing at least one computer, e.g., processor 702, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 8 control and/or configure the MME 700 or elements therein such as the processor 702, to perform the functions of the corresponding steps illustrated and/or described in the method of flowchart 600 of FIG. 6.

Assembly of modules 800 includes a module 804 configured to receive from a femto cell base station information identifying macro base stations from which signals were received by said femto base station, a module 806 configured to determine a location of the femto cell base station based on the received information identifying macro base stations from which signals were received by said femto base station, and a module 808 configured to store the determined location of the femto base station.

Assembly of modules 800 further includes a module 810 configured to receive from a femto cell base station information identifying a user equipment device which transmitted a discovery signal, e.g., a peer to peer discovery signal, detected by said femto cell base station, and a module 812 configured to update paging area information corresponding to said detected UE device to set a paging area to be used to page the detected UE device. Assembly of modules 800 further includes a module 814 configured to receive, e.g., via a base station, from a cellular active UE device information identifying a UE device which transmitted a discovery signal, e.g., a peer to peer discovery signal, detected by the cellular active UE device, a module 816 configured to receive location information identifying the location of the cellular active UE device, and a module 818 configured to update paging area information correspond to said detect UE device to set a paging area to be used to page the detected UE device.

In various embodiments, module 812 and/or module 818 either alone or in combination reduce a paging area for a UE device, e.g., a cellular inactive UE device, from a default paging area, e.g., the entire tracking area of the MME, to a smaller size area based on detected peer to peer discovery signals and the known or determined location of the device or devices which detected the peer to peer discovery signals.

Assembly of modules 800 further includes a module 820 configured to receive a request to page a UE device, a module 822 configured to retrieve stored paging area information corresponding to the UE device to be paged, a module 824 configured to identify a subset of base stations in a tracking area that are to transmit the page to UE device to be paged and a module 826 configured to send a signal to the identified subset of base stations to initiate the page to the UE device to be paged.

Various aspects and/or features of some, but not necessarily all, embodiments, are further discussed below. Various embodiments are directed to methods and apparatus of using device to device discovery, e.g., LTE-Direct (LTE-D) discovery, as a mechanism to improve, e.g., optimize, the paging load on the cellular system.

With the popularity of social networks and the internet of things, it is envisioned that devices will transmit autonomous discovery signals, e.g., peer discovery signals, periodically in radio resources assigned by the network. The range of such discovery signals is smaller than the cell radius as the discovery signals are meant for the devices in the neighborhood of the transmitter. Such discovery signals may be transmitted directly to the devices in the neighborhood without being retransmitted or relayed by a base station of the network. Note that even when a UE device is idle, it can transmit in the discovery phase.

In an exemplary embodiment, an idle UE device transmits its identity, e.g. S-TMSI, as a part of its discovery signal. The small cell base stations, e.g., femto cell base stations, in the vicinity of idle UEs discover the idle UEs from the discovery signals transmitted by the UEs and report the identities of the discovered UEs to the MME (Mobility Management Entity). If the MME is aware of the small cell base station location, it can approximately locate the UE and thus can shortlist the potential macro cells the idle UE might be in. Note that even if the MME does not know the small cell base station location, the small cell base station can report the list of macro cell base stations, e.g., eNBs, the small cell base station can discover; thereby approximately locating the UE. Similarly, the active UEs can also report to the MME the identities of the discovered idle UEs, which the active UEs discover as a result of discovery signals transmitted by the idle UEs. Since the connected (active) UE can be localized up to at least a sector level of a macro cell, the MME and the macro base station, e.g., eNB, serving the connected UE can shortlist the potential macro cells in which the idle UE might be located. Similar to the small cell base station, the connected (active) UE can also report the macro eNBs it can detect.

Figure 9:
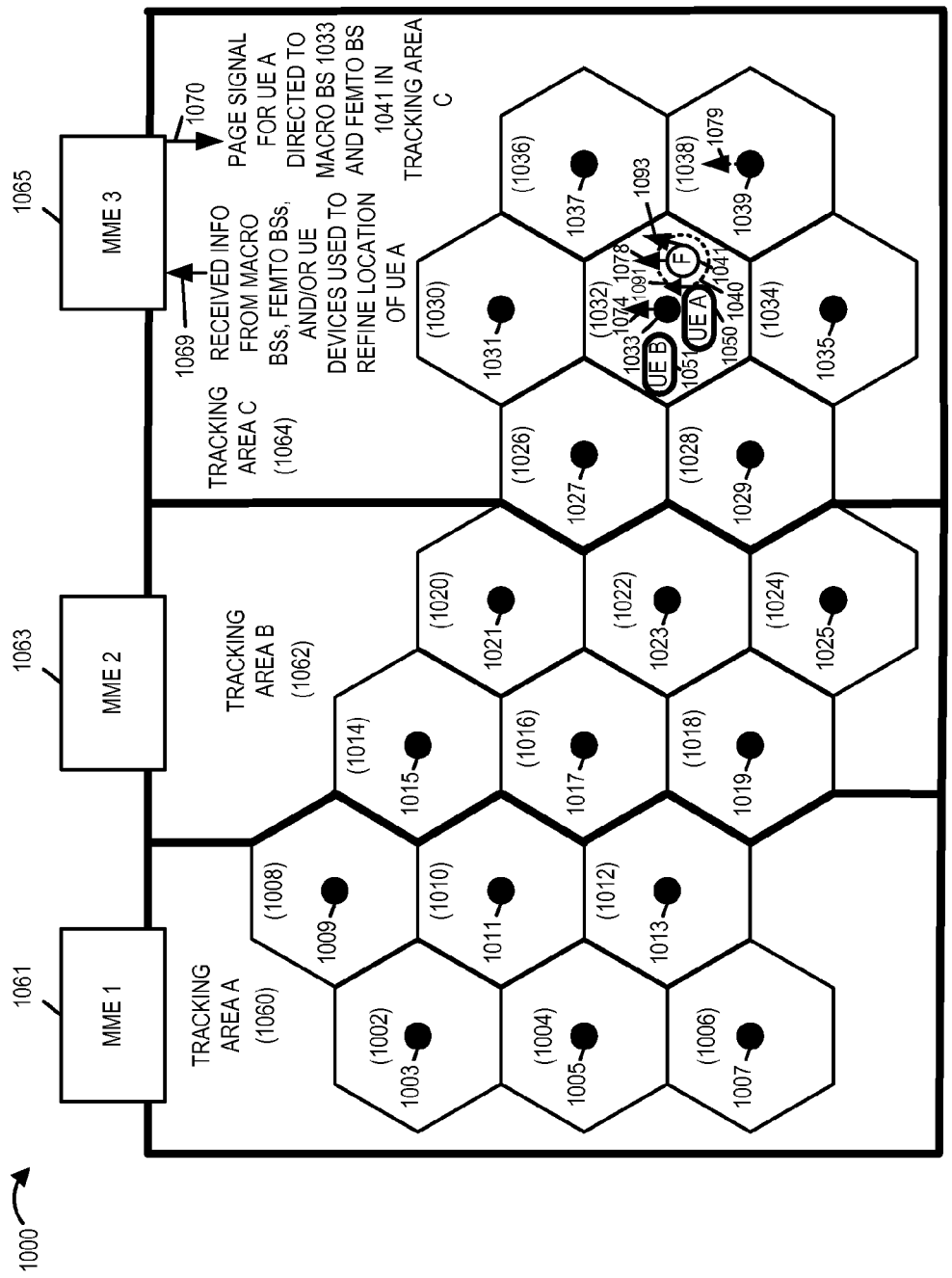
FIG. 9 illustrates an exemplary communications system implementing refined paging based on detected device to device discovery signaling in accordance with an exemplary embodiment.

FIG. 9 illustrates an exemplary communications system 1000 in accordance with an exemplary embodiment. There are a plurality of macro cells (macro cell 1002, macro cell 1004, macro cell 1006, macro cell 1008, macro cell 1010, macro cell 1012, macro cell 1014, macro cell 1016, macro cell 1018, macro cell 1020, macro cell 1022, macro cell 1024, macro cell 1026, macro cell 1028, macro cell 1030, macro cell 1032, macro cell 1034, macro cell 1036, macro cell 1038), and a plurality of corresponding macro cell base stations (macro cell BS 1003, macro cell BS 1005, macro cell BS 1007, macro cell BS 1009, macro cell BS 1011, macro cell BS 1013, macro cell BS 1015, macro cell BS 1017, macro cell BS 1019, macro cell BS 1021, macro cell BS 1023, macro cell BS 1025, macro cell BS 1027, macro cell BS 1029, macro cell BS 1031, macro cell BS 1033, macro cell BS 1035, macro cell BS 1037, macro cell BS 1039). The macro base stations are sometimes referred to as eNodeB devices. In exemplary system 1000 there are also a plurality of mobility management entities (MME 1 1061, MME 2 1063, MME 3 1065). MME 1 1061 corresponds to tracking area A 1060 which includes macro cells (1002, 1004, 1006, 1008, 1010, 1012); MME 2 1063 corresponds to tracking area B 1062 which includes macro cells (1014, 1016, 1018, 1020, 1022, 1024); and MME 3 1065 corresponds to tracking area C 1064 which includes macro cells (1026, 1028, 1030, 1032, 1034, 1036, 1038).

Macro cell 1032 further include femto cell base station 1041 with corresponding femto cell 1040. Exemplary UE A 1050 is currently situated in macro cell 1032. Exemplary UE B 1051 is also currently situated in macro cell 1032. Further consider that UE A 1050 is currently in an idle state of operation, e.g., in RCC_idle, with regard to the cellular network. Further consider that UE device A 1050 is transmitting, e.g., periodically transmitting, a discovery signal 1091 as part of device to device communications, e.g., device to device communications in a device to device communications network including UE A 1050 and UE B 1051. In some embodiments, femto base station 1041 is not part of the device to device communications network, but femto base station 1041 eavesdrops on device to device communications network discovery signaling.

In this example, the transmitted UE discovery signal 1091 is received and decoded by the femto cell base station 1041 which is close by. The femto base station 1041 reports, e.g., via transmitted signal 1093 over a backhaul, the detected discovery of UE A 1050 to MME 3 1065 of tracking area C 1064. MME 3 1065 receives signals 1069 including received information from macro BSs within its tracking area, received information from femto base stations within its tracking including a received signal corresponding to transmitted signal 1093 and received information from UE devices, e.g., active UE devices, within its tracking area which is used to refine the location of idle UE A 1050.

Consider that the MME 3 1065 is aware of the location of femto cell base station 1041, which detected the device to device discovery signals from UE A 1050. In some embodiments, the location of femto base station 1041 is fixed, predetermined and known by MME 3 1065. In some embodiments, the location of femto base station 1041 is determined by MME 3 1065 based on a list of known fixed location macro base stations whose signals were detected and measured by femto base station 1065.

In this example, consider that MME 3 1065 localizes UE A 1050 to within macro cell 1032. When the UE A 1050 is paged, the MME 3 1065 forwards the page to the macro cell base station 1031, eNB, of cell 1032, and, in some embodiments, potentially to one or more or all of the small cell base stations, e.g., femto cell base stations such as femto cell BS 1041, in cell 1032, which broadcast the page. Thus, consider that MME 3 1065 generates and transmits, e.g., over a backhaul coupling MM3 1065 to base stations within its tracking area, page signal 1070 for UE A 1050 to macro cell base station 1033 and femto cell base station 1041. Base stations (1033, 1041) generate and transmit wireless page signals (1074, 1078), respectively. In some embodiments, one of base station 1031 and base station 1041 transmits a paging signal, e.g., macro base station 1031 transmits paging signal 1074, while femto base station 1041 does not transmit a paging signal. UE device A 1050 receives and decodes one or more of page signals (1074, 1078).

Note that now the page for UE A need not be, and is not, broadcast by all the base stations in tracking area C 1064. In particular, in this particular example, macro cell base stations (1027, 1029, 1031, 1035, 1037, 1039) do not transmit a page signal.

Note that in some cases it may not be possible for an MME to localize an idle UE to within a single macro cell. In such a case, the page is forwarded to subset of the macro base stations, eNBs, in the tracking area. For example, based on a device to device discovery signal 1091 from idle UE A 1050, detected by femto BS 1041, and reported, via signal 1093, to MME 3 1065, MME 3 may direct that macro cell BS 1031 and macro cell BS 1039 transmit paging signals (1078, 1079), respectively to UE A 1050.

In various embodiments, a Mobility Management Entity (MME) controls a paging area to be used when a UE device is to be paged. In some such embodiments, the paging area size used for a UE device which does not have an active connection with a macro base station, and which may not have a connection with a femto base station, is based on device discovery signals detected by one or more femto cells and/or UE's. Thus, in some embodiments, while a UE device may only send signals to the MME to update its paging location information when it changes from one relatively large paging region, e.g., tracking area, to another, the MME refines the paging area to be smaller than a default paging area, e.g., tracking area, when location information is supplemented by information indicating that a signal was received by a femto cell base station. The signals monitored by the femto cell be station may be device-to-device discovery signals communicated by UE's on a channel which is not used by macro cells and is intended to support direct device-to-device discovery.

In various embodiments a device, e.g., a MME in system 200 of FIG. 2, and/or a MME 400 of FIG. 4, and or MME 700 of FIG. 7, and/or a MME of any of the FIGS. 2-10 includes a module corresponding to each of the individual steps and/or operations described with regard to any of the FIGS. 2-10 in the present application and/or described in the detailed description of the present application. In some embodiments, the modules are implemented in hardware, e.g., in the form of circuits. Thus, in at least some embodiments the modules may, and sometimes are implemented in hardware. In other embodiments, the modules may, and sometimes are, implemented as software modules including processor executable instructions which when executed by the processor of the device, e.g., MME, cause the device to implement the corresponding step or operation. In still other embodiments, some or all of the modules are implemented as a combination of hardware and software.

The techniques of various embodiments may be implemented using software, hardware and/or a combination of software and hardware. Various embodiments are directed to apparatus, e.g., MMEs, network nodes, mobile nodes such as mobile terminals supporting peer to peer communications, access points such as base stations including femto base stations and macro base stations, and/or communications systems. Various embodiments are also directed to methods, e.g., method of controlling and/or operating MMEs, network nodes, mobile nodes, access points such as base stations including macro base stations and femto base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments, nodes described herein are implemented using one or more modules to perform the steps corresponding to one or more methods, for example, signal processing, signal generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a MME, including a processor configured to implement one, multiple or all of the steps of one or more methods of the invention.

In some embodiments, the processor or processors, e.g., CPUs, of one or more devices, e.g., communications nodes such as MMEs, network nodes, access nodes such as base stations including macro base stations and femto base stations and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., a communications node such as a MME, with a processor which includes a module corresponding to each of the steps of the various described methods performed by the device in which the processor is included. In some but not all embodiments a device, e.g., a communications node such as a MME, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

Various embodiments are well suited for communications systems supporting macro cellular communications, femto cellular communications, and peer to peer communications. Various embodiments are well suited to communications systems using a peer to peer signaling protocol, e.g., a peer to peer signaling protocol including peer discovery signaling, in at least portion of the system. Some embodiments use an Orthogonal Frequency Division Multiplexing (OFDM) based wireless peer to peer signaling protocol, e.g., WiFi signaling protocol or another OFDM based protocol. Some embodiments, are well suited for systems supporting LTE.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with Code Division Multiple Access (CDMA), OFDM, and/or various other types of communications techniques which may be used to provide wireless communications links between communications devices. In some embodiments one or more communications devices are implemented as access points such as macro base stations and femto base stations which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of operating a mobility management entity apparatus (MME), comprising:
receiving from a first femto cell base station information identifying a first user equipment (UE) device which transmitted a first discovery signal detected by said first femto cell base station, said first discovery signal being a signal which supports direct device to device discovery, wherein the first UE device is a cellular inactive UE device that is in an inactive state with regard to macro cellular communications and femto cellular communications and receives no communications from the first femto cell base station;
updating paging area information corresponding to the first UE device, that is used for controlling paging of the first UE device, to set a paging area to be used to page the first UE device to be a first area, said first area being smaller than an area which is used to page said first UE device prior to a femto cell base station reporting detection of a discovery signal corresponding to said first UE device which supports direct device to device discovery to said MME; and wherein updating paging area information corresponding to the first UE device to set the paging area to be used to page the first UE device to be the first area includes reducing the paging area from a tracking area to a smaller area based on a location of the femto cell base station reporting detection of the discovery signal.

2. The method of claim 1, further comprising:
receiving, from said first femto cell base station, information identifying macro base stations from which signals were received by said first femto cell base station.

3. The method of claim 2, further comprising:
determining a location of said first femto cell base station based on the received information identifying macro base stations from which signals were received by said femto cell base station.

4. The method of claim 1, further comprising:
receiving from a second UE device information indicating that the second UE device received a signal from the first UE device; and
updating said first area based on a location of the second UE device.

5. The method of claim 1, wherein the first discovery signal is a peer to peer discovery signal transmitted periodically by said first UE device.

6. The method of claim 1, wherein the first discovery signal was transmitted on a peer to peer discovery channel which is not used for discovery of devices operating in a cellular mode of operation.

7. The method of claim 1,
wherein said first UE device is part of a peer to peer network; and
wherein the femto cell base station which detected the first discovery signal is not part of said peer to peer network.

8. A mobility management entity apparatus (MME) comprising:
means for receiving from a first femto cell base station information identifying a first user equipment (UE) device which transmitted a first discovery signal detected by said first femto cell base station, said first discovery signal being a signal which supports direct device to device discovery, wherein the first UE device is a cellular inactive UE device that is in an inactive state with regard to macro cellular communications and femto cellular communications and receives no communications from the first femto cell base station;
means for updating paging area information corresponding to the first UE device, that is used for controlling paging of the first UE device, to set a paging area to be used to page the first UE device to be a first area, said first area being smaller than an area which is used to page said first UE device prior to a femto cell base station reporting detection of a discovery signal corresponding to said first UE device which supports direct device to device discovery to said MME; and
wherein updating paging area information corresponding to the first UE device to set the paging area to be used to page the first UE device to be the first area includes reducing the paging area from a tracking area to a smaller area based on a location of the femto cell base station reporting detection of the discovery signal.

9. The MME of claim 8, further comprising:
means for receiving, from said first femto cell base station, information identifying macro base stations from which signals were received by said first femto cell base station.

10. The MME of claim 9, further comprising:
means for determining a location of said first femto cell base station based on the received information identifying macro base stations from which signals were received by said first femto cell base station.

11. The MME of claim 8, further comprising:
means for receiving from a second UE device information indicating that the second UE device received a signal from the first UE device; and
means for updating said first area based on a location of the second UE device.

12. The MME of claim 8, wherein the first discovery signal was transmitted on a peer to peer discovery channel which is not used for discovery of devices operating in a cellular mode of operation.

13. A computer program product for use in a mobility management entity apparatus (MME), the computer program product comprising:
a non-transitory computer readable medium storing codes, when executed by a processor perform the steps:
receiving from a first femto cell base station information identifying a first user equipment (UE) device which transmitted a first discovery signal detected by said first femto cell base station, said first discovery signal being a signal which supports direct device to device discovery, wherein the first UE device is a cellular inactive UE device that is in an inactive state with regard to macro cellular communications and femto cellular communications and receives no communications from the first femto cell base station; and
updating paging area information corresponding to the first UE device, that is used for controlling paging of the first UE device, to set a paging area to be used to page the first UE device to be a first area, said first area being smaller than an area which is used to page said first UE device prior to a femto cell base station reporting detection of a discovery signal corresponding to said first UE device which supports direct device to device discovery to said MME; and
wherein updating paging area information corresponding to the first UE device to set the paging area to be used to page the first UE device to be the first area includes reducing the paging area from a tracking area to a smaller area based on a location of the femto cell base station reporting detection of the discovery signal.

14. A mobility management entity apparatus (MME) comprising:
at least one processor configured to:
receive from a first femto cell base station information identifying a first user equipment (UE) device which transmitted a first discovery signal detected by said first femto cell base station, said first discovery signal being a signal which supports direct device to device discovery, wherein the first UE device is a cellular inactive UE device that is in an inactive state with regard to macro cellular communications and femto cellular communications and receives no communications from the first femto cell base station; and
update paging area information corresponding to the first UE device, that is used for controlling paging of the first UE device, to set a paging area to be used to page the first UE device to be a first area, said first area being smaller than an area which is used to page said first UE device prior to a femto cell base station reporting detection of a discovery signal corresponding to said first UE device which supports direct device to device discovery to said MME; and memory coupled to said at least one processor; and wherein said processor is configured to reduce the paging area from a tracking area to a smaller area based on a location of the femto cell base station reporting detection of the discovery signal, as part of being configured to update paging area information corresponding to the first UE device to set the paging area to be used to page the first UE device to be the first area.

15. The MME of claim 14, wherein said at least one processor is further configured to:

receive, from said first femto cell base station, information identifying macro base stations from which signals were received by said first femto cell base station.

16. The MME of claim 15, wherein said at least one processor is further configured to:

determine a location of said first femto cell base station based on the received information identifying macro base stations from which signals were received by said first femto cell base station.

17. The MME of claim 14, wherein said at least one processor is further configured to:

receive from a second UE device information indicating that the second UE device received a signal from the first UE device; and update said first area based on a location of the second UE device.

* * * * *